(12) United States Patent
Tsuboi

(10) Patent No.: US 6,848,098 B1
(45) Date of Patent: Jan. 25, 2005

(54) PROCESS AND APPARATUS FOR OPTIMIZING PROGRAM WRITTEN IN INTERPRETIVE LANGUAGE FOR EACH CALLABLE PROGRAM PART BASE ON FREQUENCY OF EXECUTIONS

(75) Inventor: Akira Tsuboi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 09/626,372

(22) Filed: Jul. 26, 2000

(30) Foreign Application Priority Data

Nov. 18, 1999 (JP) .......................................... 11-328046

(51) Int. Cl.⁷ .............................................. G06F 9/45
(52) U.S. Cl. ..................................................... 717/151
(58) Field of Search ................................ 717/151–161, 717/149–150, 140–148, 127, 130, 131

(56) References Cited

U.S. PATENT DOCUMENTS

| | | | | |
|---|---|---|---|---|
| 5,428,793 A | * | 6/1995 | Odnert et al. ................ | 717/157 |
| 5,457,799 A | * | 10/1995 | Srivastava ................... | 717/160 |
| 5,613,118 A | * | 3/1997 | Heisch et al. ................ | 717/158 |
| 5,802,373 A | * | 9/1998 | Yates et al. .................. | 717/139 |
| 5,805,895 A | * | 9/1998 | Breternitz et al. ........... | 717/160 |
| 5,854,933 A | * | 12/1998 | Chang ......................... | 717/158 |
| 5,966,537 A | * | 10/1999 | Ravichandran .............. | 717/158 |
| 5,970,249 A | | 10/1999 | Hölzle et al. ................ | 717/153 |
| 6,292,940 B1 | * | 9/2001 | Sato ............................ | 717/157 |
| 6,408,433 B1 | * | 6/2002 | Click et al. .................. | 717/154 |

FOREIGN PATENT DOCUMENTS

| | | |
|---|---|---|
| JP | 59125444 | 7/1984 |
| JP | 63276127 | 11/1988 |
| JP | 11-237989 | 8/1999 |

OTHER PUBLICATIONS

"Compliers: Principles, Techniques, and Tools", Alfred Aho, 1986. Chapter 10: Code Optimization.*

* cited by examiner

Primary Examiner—Wei Y. Zhen
(74) Attorney, Agent, or Firm—Greer, Burns & Crain, Ltd.

(57) ABSTRACT

In a process of optimizing a program which includes a plurality of callable program parts, at least one frequency of executions of at least one of the callable program parts is determined, and a necessary optimization level of the at least one callable program part is determined based on the at least one frequency of executions of the at least one callable program part. The at least one callable program part is optimized at the determined necessary optimization level. The at least one frequency may be determined based on the number of times each of the at least one callable program part is executed, and the optimization is performed as a background operation of execution of the at least one callable program part, where a priority of the optimization is lower than a priority of the execution of the at least one callable program part.

6 Claims, 7 Drawing Sheets

| FUNCTION | NUMBER OF EXECUTIONS | CURRENT OPTIMIZATION LEVEL | REQUIRED OPTIMIZATION LEVEL |
|---|---|---|---|
| INITIALIZATION FUNCTION | 1 | LOW | LOW |
| func1 | 54 | LOW | MIDDLE |
| func2 | 100 | MIDDLE | MIDDLE |
| TERMINATION FUNCTION | 1 | LOW | LOW |

FIG. 4

| NUMBER OF EXECUTIONS | REQUIRED OPTIMIZATION LEVEL |
|---|---|
| 1~50 | LOW |
| 51~100 | MIDDLE |
| 101~ | HIGH |

FIG. 5

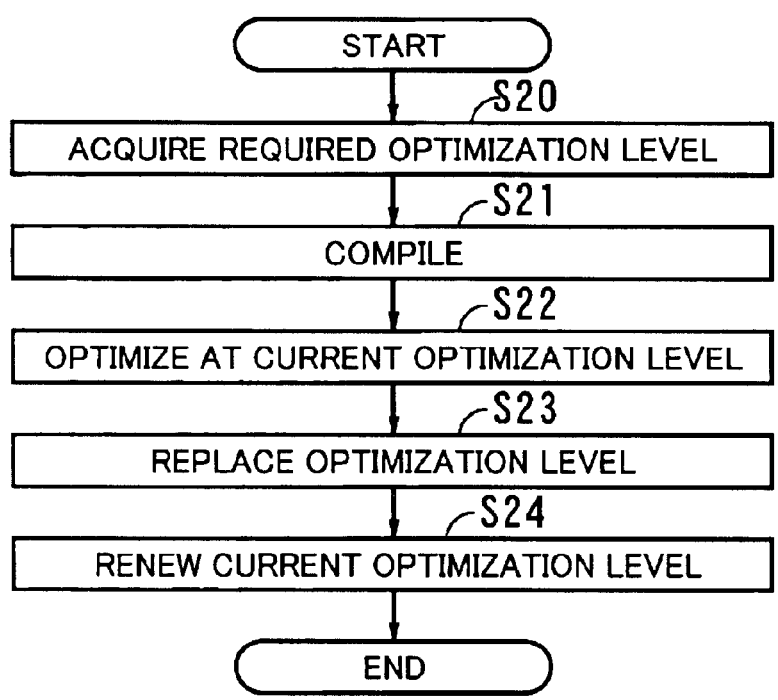
F I G. 6

| OPTIMIZATION LEVEL | DETAIL OF OPTIMIZATION |
|---|---|
| LOW | MOVE LOOP INVARIANT OPERATION TO OUTSIDE OF LOOP |
| MIDDLE | ENHANCE EFFICIENCY IN USE OF REGISTER |
| HIGH | IN-LINE EXPANSION |

FIG. 7

PROCESS AND APPARATUS FOR OPTIMIZING PROGRAM WRITTEN IN INTERPRETIVE LANGUAGE FOR EACH CALLABLE PROGRAM PART BASE ON FREQUENCY OF EXECUTIONS

BACKGROUND OF THE INVENTION

1) Field of the Invention

The present invention relates to a process and an apparatus for optimizing a program which includes a plurality of callable program parts, and is written in an interpretive language.

2) Description of the Related Art

The programming languages can be broadly divided into compiler languages and interpretive languages. When a source program is written in a compiler language, the CPU first translates the whole source program into a machine-interpretable representation, before executing the program. On the other hand, when a source program is written in an interpretive language, the CPU sequentially interprets respective portions of the source program during execution of the program.

Since the whole source program is translated into a machine-interpretable representation before executing the program, the execution rates of programs written in compiler languages are higher than those written in interpretive language.

On the other hand, when a source program is written in an interpretive language, it is unnecessary to translate the whole source program into a machine-interpretable representation before executing the program, and therefore processing performed by the CPU becomes simple.

However, when a source program is written in an interpretive language, the execution rates of the program is low since overhead during the execution is great.

Conventionally, various methods have been proposed for optimizing the program and increasing the execution rates of the program. However, according to the conventional methods, the whole program is uniformly optimized at a certain optimization level. That is, the optimization is performed on even a portion of the program which is rarely executed, at the same optimization level as a portion of the program which is frequently executed. Therefore, the conventional optimization is not efficient.

In addition, although the execution rate of the program increases with the degree (level) of the optimization, the time needed for optimization processing per se also increases with the degree of the optimization. Therefore, it is difficult to determine an appropriate optimization level.

SUMMARY OF THE INVENTION

An object of the present invention is to provide a process for optimizing a program written in an interpretive language, wherein the program can be appropriately optimized so as to increase an execution rate of the program.

Another object of the present invention is to provide an apparatus for optimizing a program written in an interpretive language, wherein the program can be appropriately optimized so as to increase an execution rate of the program.

(1) According to the first aspect of the present invention, there is provided a process of optimizing a program which includes a plurality of callable program parts, comprising the steps of: (a) determining at least one frequency of executions of at least one of the plurality of callable program parts; (b) determining a necessary optimization level of the at least one of the plurality of callable program parts based on the at least one frequency of executions of the at least one of the plurality of callable program parts; and (c) performing optimization of the at least one of the plurality of callable program parts at the necessary optimization level determined in the step (b).

The process according to the first aspect of the present invention may also have one or any possible combination of the following additional features (i) and (ii).

(i) In the step (a), the at least one frequency of executions of the at least one of the plurality of callable program parts is determined based on the number of times each of the at least one of the plurality of callable program parts is executed.

(ii) In the step (c), the optimization is performed as a background operation of execution of the at least one of the plurality of callable program parts, where the priority of the optimization is lower than the priority of the execution of the at least one of the plurality of callable program parts.

(2) According to the second aspect of the present invention, there is provided a process of optimizing a program which includes a plurality of callable program parts, and is written in an interpretive language, comprising the steps of: (a) determining the number of times one of the plurality of callable program parts is executed; (b) determining whether or not the number of times exceeds a predetermined threshold; and (c) optimizing the one of the plurality of callable program parts when the number of times exceeds a predetermined threshold.

In the step (c) of the process according to the second aspect of the present invention, the optimization is performed as a background operation of execution of at least one of the plurality of callable program parts, where the priority of the optimization is lower than the priority of the execution of the at least one of the plurality of callable program parts.

(3) According to the third aspect of the present invention, there is provided a process of executing a program which includes a plurality of callable program parts, and is written in an interpretive language, comprising the steps of: (a) acquiring one of the plurality of callable program parts; (b) compiling the one of the plurality of callable program parts; (c) optimizing the one of the plurality of callable program parts at an initial optimization level; (d) storing in a memory the one of the plurality of callable program parts optimized at the initial optimization level; (e) optimizing the one of the plurality of callable program parts stored in the memory, at an optimization level which is higher than a current optimization level, when the number of times the one of the plurality of callable program parts is executed exceeds a predetermined threshold; and (f) storing in the memory the one of the plurality of callable program parts optimized in the step (e).

(4) According to the fourth aspect of the present invention, there is provided an apparatus of optimizing a program which includes a plurality of callable program parts, comprising: a frequency determining unit which determines at least one frequency of executions of at least one of the plurality of callable program parts; an optimization level determining unit which determines a necessary optimization level of the at least one of the plurality of callable program parts based on the at least one frequency of executions of the at least one of the plurality of callable program parts; and an optimizing unit which performs optimization of the at least one of the plurality of callable program parts at the necessary optimization level determined by the optimization level determining unit.

The apparatus according to the fourth aspect of the present invention may also have one or any possible combination of the following additional features (iii) and (iv).

(iii) The frequency determining unit determines the at least one frequency of executions of the at least one of the plurality of callable program parts based on the number of times each of the at least one of the plurality of callable program parts is executed.

(iv) The optimizing unit performs the optimization as a background operation of execution of the at least one of the plurality of callable program parts, where the priority of the optimization is lower than the priority of the execution of the at least one of the plurality of callable program parts.

(5) According to the fifth aspect of the present invention, there is provided an apparatus of optimizing a program which includes a plurality of callable program parts, and is written in an interpretive language, comprising: a counting unit which counts the number of times one of the plurality of callable program parts is executed; a determining unit which determines whether or not the number of times exceeds a predetermined threshold; and an optimizing unit which optimizes the one of the plurality of callable program parts when the number of times exceeds a predetermined threshold.

In the apparatus according to the fifth aspect of the present invention, the optimizing unit performs the optimization as a background operation of execution of at least one of the plurality of callable program parts, where the priority of the optimization is lower than the priority of the execution of the at least one of the plurality of callable program parts.

(6) According to the sixth aspect of the present invention, there is provided an apparatus of executing a program which includes a plurality of callable program parts, and is written in an interpretive language, comprising: an acquiring unit which acquires one of the plurality of callable program parts; a compiling unit which compiles the one of the plurality of callable program parts; a first optimizing unit which optimizes the one of the plurality of callable program parts at an initial optimization level; a first storing unit which stores in a memory the one of the plurality of callable program parts optimized at the initial optimization level; a second optimizing unit which optimizes the one of the plurality of callable program parts stored in the memory, at an optimization level which is higher than a current optimization level, when the number of times the one of the plurality of callable program parts is executed exceeds a predetermined threshold; and a second storing unit which stores in the memory the one of the plurality of callable program parts optimized by the second optimizing unit.

(7) According to the seventh aspect of the present invention, there is provided an apparatus for executing a program which includes a plurality of callable program parts, and is written in an interpretive language, comprising: a compiling unit which compiles at least one of the plurality of callable program parts; a storing unit which stores the at least one of the plurality of callable program parts which is compiled into a compiled form: an executing unit which executes the at least one of the plurality of callable program parts which is stored in the storing unit; a counting unit which counts the number of times the at least one of the plurality of callable program parts is executed; and an optimizing unit which optimizes each of the at least one of the plurality of callable program parts at an optimization level which is higher than a current optimization level, when the number of times the said each of the at least one of the plurality of callable program parts is executed exceeds a predetermined threshold.

The apparatus according to the seventh aspect of the present invention may also have one or any possible combination of the following additional features (vi) and (vii).

(vi) The optimizing unit optimizes the at least one of the plurality of callable program parts in parallel with execution of the at least one of the plurality of callable program parts, and the executing unit executes each of the at least one of the plurality of callable program parts which is not optimized by the optimizing unit, until the optimizing unit completes the operation of optimizes the said each of the at least one of the plurality of callable program parts.

(vii) The priority of the operation of the optimizing unit is lower than the priority of the operation of the executing unit.

(8) According to the eighth aspect of the present invention, there is provided a product for use with an apparatus for optimizing a program which includes a plurality of callable program parts, and is written in an interpretive language, the product, when used with the apparatus, is able to output control information which directs the apparatus to realize each of the apparatuses according to the fourth to seventh aspects of the present invention.

As explained above, according to the first to eighth aspects of the present invention, the optimization level of each callable program part is raised with increase in the frequency of executions of the callable program part. Therefore, the execution rate of the program can be increased in total.

In addition, the operation of background optimization may be performed in parallel with the execution of the program including the callable program parts, and the priority of the background optimization can be set to be lower than the priority of the execution of the program. Further, the callable program part optimized at the necessary optimization level can be executed after the background optimization of the callable program part is completed, Therefore, the optimization can be performed without causing delay in or imposing load on the execution of the program.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 4 is a diagram illustrating examples of control data controlled by the optimization control unit;

FIG. 5 is a diagram illustrating an example of a relationship between the number of executions and a required optimization level;

FIG. 6 is a flowchart illustrating an example of a sequence of background optimization processing performed in step S12 of FIG. 3; and FIG. 7 is a diagram illustrating an example of a relationship between the required optimization level and optimization processing.

DESCRIPTION OF THE PREFERRED EMBODIMENTS

An embodiment of the present invention is explained below with reference to drawings.

(1) Outline of Program Execution Apparatus

Figure 1:
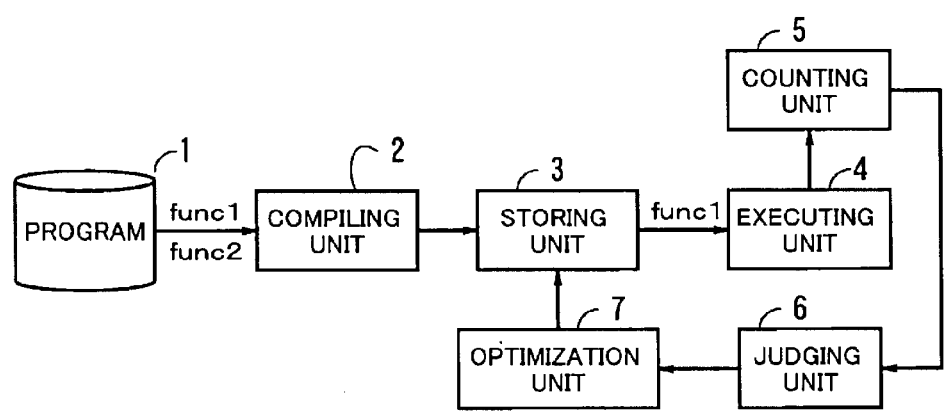
FIG. 1 is a diagram illustrating a basic construction of a program execution apparatus as an embodiment of the present invention.

FIG. 1 is a diagram illustrating a basic construction of a program execution apparatus as an embodiment of the present invention. The program execution apparatus of FIG. 1 comprises a program 1, a compiling unit 2, a storing unit 3, a executing unit 4, a counting unit 5, a judging unit 6, and an optimization unit 7.

The program 1 includes a plurality of callable program parts, which are, for example, functions, methods, procedures, and the like. Each callable program part is called as a unit during execution of the program.

The compiling unit 2 acquires one of the plurality of callable program parts from the program 1, and compiles the callable program part to produce a machine-executable code representing the callable program part.

The storing unit 3 receives the machine-executable code, and stores the machine-executable code in a predetermined region of the storing unit 3.

The executing unit 4 executes the machine-executable code stored in the storing unit 3.

The counting unit 5 counts the number of executions of each callable program part, i.e., the number of times each callable program part is executed.

The judging unit 6 determines whether or not the number of executions of a callable program part exceeds a predetermined threshold, and notifies the optimization unit 7 of the excess of the number of executions over the predetermined threshold when the judging unit 6 determines that the number of executions of the callable program part exceeds a predetermined threshold.

The optimization unit 7 optimizes or re-optimizes a callable program part so that the optimization level of the callable program part is raised to a higher optimization level, when the optimization unit 7 receives the notification of the excess of the number of executions of the callable program part.

The operation of the program execution apparatus of FIG. 1 is as follows.

When execution of the program 1 is started, one of the plurality of callable program parts which should be first executed is acquired and compiled by the compiling unit 2, and the compiled callable program part is then stored in a predetermined region of in the storing unit 3. Next, the callable program part stored in the storing unit 3 is executed by the executing unit 4. At this time, the counting unit 5 increments a count indicating the number of executions. For example, when a function "func1" (as a callable program part) is first executed, the counting unit 5 increments the count for the function "func1" from "0" to "1". The judging unit 6 receives the count, and determines whether or not the number of executions exceeds the predetermined threshold. For example, when the count for the function "func1" is "102", and the predetermined threshold is "100", the judging unit 6 determines the excess of the number of executions over the predetermined threshold, and notifies the optimization unit 7 of the excess. When the optimization unit 7 receives the notification, the optimization unit 7 optimizes the callable program part of which the number of executions is indicated by the above count so as to raise the optimization level of the callable program part. For example, when the optimization level of the function "func2" is "low", the optimization unit 7 optimizes the function "func2" so that the optimization level of the function "func2" becomes "middle". The operation of the optimization unit 7 is performed in parallel with the execution of the program 1, and the priority of the optimization processing is set to be lower than the priority of the execution of the program 1. The executing unit 4 executes each callable program part at an optimization level which has not yet been raised, until the optimization of a callable program part is completed. When the optimization of the callable program part is completed, the executing unit 4 executes the callable program part at an optimization level which has been raised. Therefore, the optimization can be performed without delay in the execution of the program 1. Thus, the execution rate of the program 1 can be increased due to the optimization.

Thus, according to the above operation, the optimization level of each callable program part is raised with increase in the frequency of executions of the callable program part. Therefore, the execution rate of the program 1 can be increased in total.

(2) Construction of Embodiment

Figure 2:
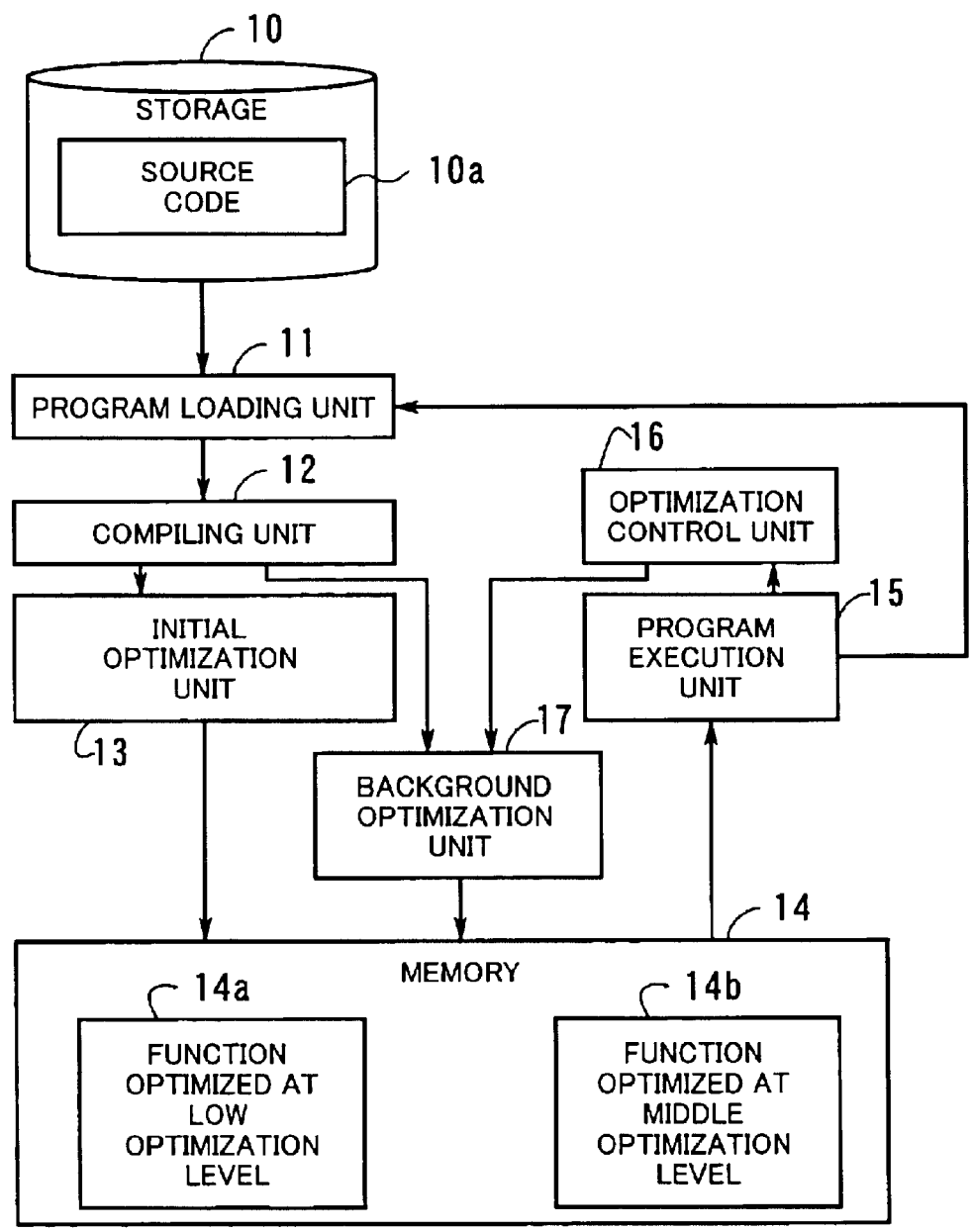
FIG. 2 is a diagram illustrating in detail the construction of the program execution apparatus as an embodiment of the present invention.

FIG. 2 is a diagram illustrating in detail the construction of the program execution apparatus as the embodiment of the present invention. The program execution apparatus of FIG. 2 comprises a storage 10, a program loading unit 11, a compiling unit 12, an initial optimization unit 13, a memory 14, a program execution unit 15, an optimization control unit 16, and a background optimization unit 17.

The storage 10 is realized by, for example, a hard disk drive (HDD), and stores a source code of a program 10a, which includes a plurality of functions.

The program loading unit 11 acquires from the program 1 one of the plurality of functions which is currently required to be executed, and supplies the acquired function to the compiling unit 12.

The compiling unit 12 compiles the acquired function to produce a machine-executable code representing the acquired function.

The initial optimization unit 13 optimizes the machine-executable code representing the acquired function, and stores the optimized machine-executable code in the memory 14.

The memory 14 is realized by, for example, a random access memories (RAM), and stores the optimized machine-executable code representing the acquired function.

The program execution unit 15 executes the function represented by the machine-executable code, which is stored in memory 14.

The optimization control unit 16 counts the number of executions of each function by the program execution unit 15, determines whether or not the number of executions exceeds a predetermined threshold, and notifies the background optimization unit 17 of the excess of the number of executions over the predetermined threshold when the optimization control unit 16 determines that the number of executions exceeds a predetermined threshold.

The background optimization unit 17 optimizes or re-optimizes a machine-executable code representing a function so that the optimization level of the machine-executable code is raised to a higher optimization level, when the background optimization unit 17 receives the notification of the excess of the number of executions of the function. The operation of the background optimization unit 17, i.e., the background optimization, will be explained in detail later with reference to FIG. 6.

(3) Operation Flow

Figure 3:
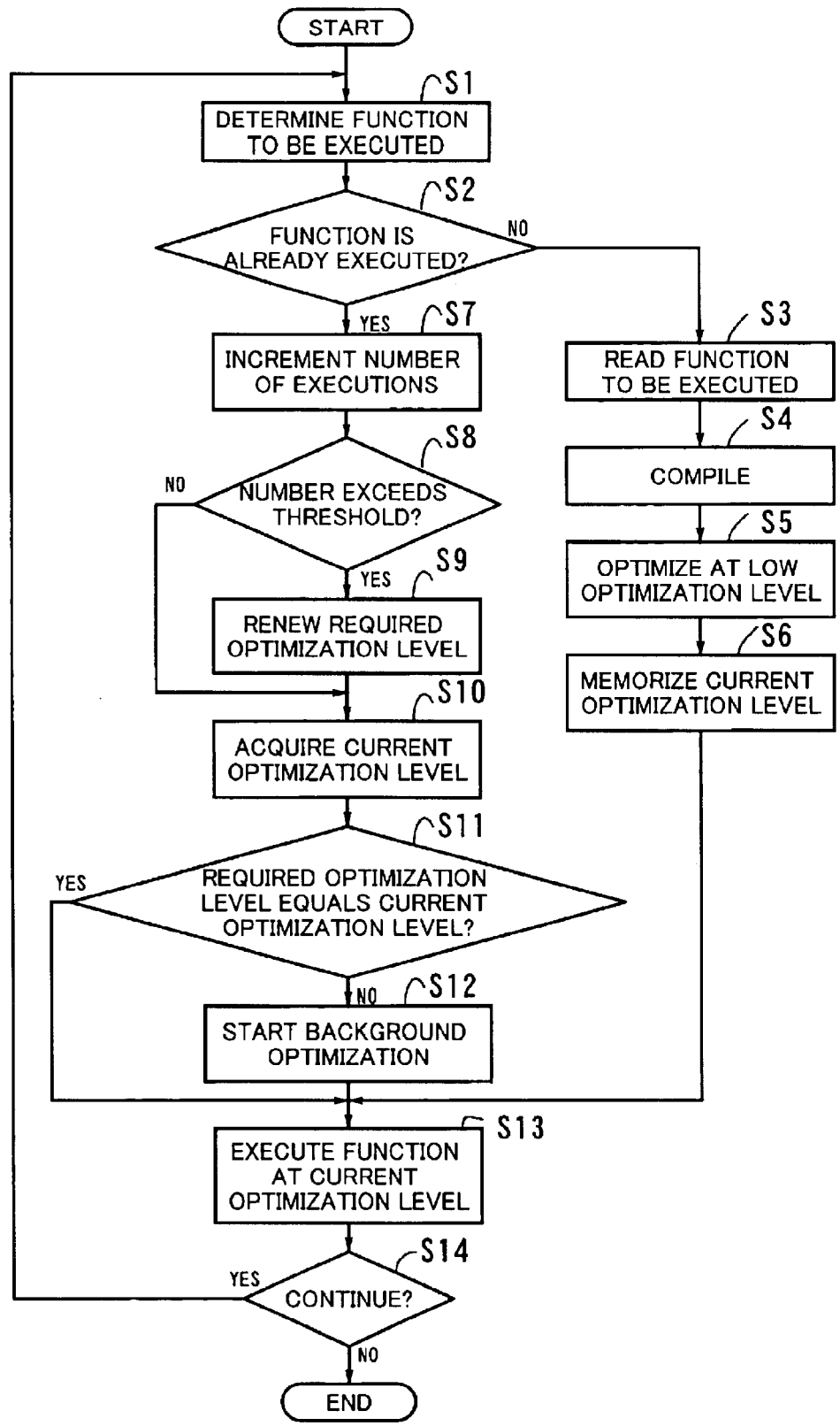
FIG. 3 is a flowchart illustrating an example of a sequence of operations performed in the construction of FIG. 2.

FIG. 3 is a flowchart illustrating an example of a sequence of operations performed in the construction of FIG. 2.

In step S1, the program execution unit 15 determines one of the plurality of functions which is to be executed.

In step S2, it is determined whether or not the function to be executed has already been executed. When yes is determined, the operation goes to step S7. When no is determined, the operation goes to step S3.

In step S3, the program execution unit 15 controls the program loading unit 11 so that the function to be executed is read in from the storage 10.

In step S4, the compiling unit 12 compiles the function which is read in from the storage 10 and supplied by the program loading unit 11.

In step S5, the initial optimization unit 13 performs, on the above function, optimization at the low optimization level, and stores the optimized function in a predetermined region of the memory 14.

In step S6, the optimization control unit 16 memorizes the current optimization level (i.e., the low level) of the above function optimized in step S5.

FIG. 4 is a diagram illustrating examples of control data controlled by the optimization control unit 16. In the example of FIG. 4, the optimization control unit 16 stores, for each function, the name, the number of executions, the current optimization level, and a required optimization level, which are associated with each other. In FIG. 4, the "number of executions" is the number of times each function has been executed, the "current optimization level" is the optimization level of each function at which the function is currently optimized, and the "required optimization level" is the optimization level of each function at which each function should be optimized based on the number of executions. Since it takes a substantial time to complete the optimization of each function, the current optimization level is not always identical with the required optimization level.

In step S7, the optimization control unit 16 increments a count indicating the number of executions of the function to be executed.

In step S8, the optimization control unit 16 determines whether or not the number of executions of the function exceeds the predetermined threshold. When yes is determined, the operation goes to step S9. When no is determined, the operation goes to step S10.

FIG. 5 is a diagram illustrating an example of a relationship between the number of executions and the required optimization level. In the example of FIG. 5, the required optimization level is "low" when the number of executions is 1 to 50, "middle" when the number of executions is 51 to 100, and "high" when the number of executions is 101 or more.

In step S9, the optimization control unit 16 renews the required optimization level. For example, when the number of executions of the function "func2", which is indicated in FIG. 4, increases from "100" to "101", the required optimization level changes from "middle" to "high", as illustrated in FIG. 5. Therefore, the optimization control unit 16 changes the data of the required optimization level of the function "func2" from "middle" to "high" in FIG. 4.

In step S10, the optimization control unit 16 acquires the current optimization level of the function to be executed, from the stored control data as illustrated in FIG. 4.

In step S11, the optimization control unit 16 compares the current optimization level with the required optimization level to determine whether or not the current optimization level is identical with the required optimization level. When yes is determined, the operation goes to step S13. When no is determined, the operation goes to step S12.

In step S12, the optimization control unit 16 controls the background optimization unit 17 so as to start the background optimization, which is performed as explained later with reference to FIG. 6.

In step S13, the program execution unit 15 executes the function at the current optimization level. That is, the function which is not optimized by the background optimization unit 17 is executed until the operation of the background optimization is completed, and the function optimized by the background optimization unit 17 is executed after the operation of the background optimization is completed.

In step S14, the program execution unit 15 determines whether or not the operation of FIG. 3 is to be continued. When yes is determined, the operation goes to step S1. When no is determined, the operation of FIG. 3 is completed.

(4) Background Optimization

FIG. 6 is a flowchart illustrating an example of a sequence of background optimization processing performed in the operation of FIG. 3. The operation of background optimization is performed in parallel with the execution of the program including the functions, and the priority of the background optimization is set to be lower than the priority of the execution of the program. That is, the operation of background optimization is performed when the processing load is not heavy during the operation of FIG. 3.

In step S20, the background optimization unit 17 acquires the required optimization level of the function to be optimized, from the optimization control unit 16.

In step S21, the compiling unit 12 acquires the function to be executed, from the source code 10a stored in the storage 10, through the program loading unit 11. Then, the compiling unit 12 compiles the acquired function.

In step S22, the background optimization unit 17 acquires the compiled function from the compiling unit 12, and performs optimization processing in accordance with the required optimization level which is acquired in step S20.

FIG. 7 is a diagram illustrating an example of a relationship between the required optimization level and optimization processing. In the example of FIG. 7, the following optimizing operations are performed at the respective optimization levels.

At the low optimization level, loop invariant operations (instructions or codes) included in loops are moved to the outside of the loops, i.e., operations which are originally included in loops, and are not influenced by the loop operations, are removed from the loops, and placed outside the loops, so that the total execution rate is increased.

At the middle optimization level, operations for enhancing efficiency in use of registers are performed. For example, when the program includes an instruction to load a value in a register, and the register already contains the value, the instruction is removed, so that the total execution rate is increased.

At the high optimization level, in-line expansion of functions is performed. That is, code descriptions of procedures and functions are embedded in the code description of the program, instead of calling the procedures and functions, so that operations of saving variables and the like, which are necessary when the procedures or functions are called, can be dispensed with. Thus, the execution rate can be increased.

However, optimizing operations performed at the respective optimization levels may not be the above operations, and any other optimizing operations may be performed at the respective optimization levels.

In step S23, the background optimization unit 17 renews the function to be executed, in the memory 14. That is, the background optimization unit 17 replaces the function stored in the memory 14 (which is optimized at the current optimization level), with the function optimized (at the required optimization level) in step S22.

In step S24, the optimization control unit 16 renews the current optimization level of the above function, in the control data as illustrated in FIG. 4.

Thus, after the above background optimization of a function is completed in step S24 of FIG. 6, the function optimized at the required optimization level can be executed in step S13 of FIG. 3. For example, in the case where the current optimization level is the low optimization level when the background optimization is started in step S12 of FIG. 3, and the required optimization level is the middle optimization level, the program execution unit 15 executes the function 14a optimized at the low optimization level until the background optimization of the function is completed, and the program execution unit 15 executes the function 14b optimized at the middle optimization level after the background optimization of the function is completed.

As explained above, in the embodiment of the present invention, the optimization level of each function is raised with increase in the frequency of executions of the function. Therefore, the execution rate of the program can be increased in total.

In addition, the operation of background optimization is performed in parallel with the execution of the program including the functions, and the priority of the background optimization is set to be lower than the priority of the execution of the program, and the function on which optimization is performed is a function optimized at the current optimization level until the background optimization of the function is completed. Therefore, the optimization can be performed without causing delay in or imposing load on the execution of the program.

(5) Other Matters (i) The present invention is more advantageous in a multiprocessor environment than in a single processor environment. That is, the execution rate is further increased in multiprocessor environment than in a single processor environment.

(ii) In addition, the operations and the functions of the present invention may be realized by using a certain product with an apparatus provided for executing a program which includes a plurality of callable program parts, e.g., by installing a computer-readable medium in a computer. The product is such that when the product is used with the apparatus (e.g., a computer), the product is able to output control information which directs the apparatus to realize any of the functions of the present invention. The product may be a semiconductor storage device storing a program which realizes the above functions, such as a ROM, or a magnetic storage medium such as a floppy disc or a hard disk, or a CD-ROM, a CD-R, a DVD-ROM, a DVD-RAM, a DVD-R, or the like. Further, the: above product may be a programmed hardware logic circuit such as an LSI. The above product per se can be put into the market. Alternatively, program data realizing the above functions may be transferred through a communication network from a storage device included in a computer system to another computer system. In order to execute the program in a computer system, for example, the program stored in a hard disk is loaded in a main memory of the computer system.

(iii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iv) All of the contents of the Japanese patent application, No. 11-328046 are incorporated into this specification by reference.

What is claimed is:

1. A process of optimizing a program which includes a plurality of callable program parts, and is written in an interpretive language, comprising the steps of:

(a) providing first, second, and third predetermined thresholds;

(b) determining the number of times one of the plurality of callable program parts is executed;

(c) determining whether said number of times exceeds one of the first, second, or third predetermined thresholds that have successively larger values; and (d) optimizing said one of said plurality of callable program parts by:

moving instructions that perform invariant operations in a loop outside the loop when said number of times exceeds the first predetermined threshold, enhancing an efficiency of a register usage when said number of times exceeds the second predetermined threshold, and expanding said one of the callable program parts into an in-line form when said number of times exceeds the third predetermined threshold.

2. A process according to claim 1, wherein in said step (d), said optimization is performed as a background operation of execution of at least one of said plurality of callable program parts, where a priority of the optimization is lower than a priority of the execution of said at least one of said plurality of callable program parts.

3. An apparatus of optimizing a program which includes a plurality of callable program parts, and is written in an interpretive language, comprising:

a counting unit which counts the number of times one of the plurality of callable parts is executed;

a determining unit which determines whether or not said number of times exceeds one of the first, second, or third predetermined thresholds that have successively larger values; and an optimizing unit which optimizes said one of said plurality of callable program parts by:

moving instructions that perform invariant operations in a loop outside the loop when said number of times exceeds the first predetermined threshold, enhancing an efficiency of a register usage when said number of times exceeds the second predetermined threshold, and expanding said one of the callable program parts into an in-line form when said number of times exceeds the third predetermined threshold.

4. An apparatus according to claim 3, wherein said optimizing unit performs said optimization as a background operation of execution of at least one of said plurality of callable program parts, where a priority of the optimization is lower than a priority of the execution of said at least one of said plurality of callable program parts.

5. A product for use with an apparatus for optimizing a program which includes a plurality of callable program parts, and is written in an interpretive language, said product, when used with said apparatus, is able to output control information which directs the apparatus, and comprises:

a counting unit which counts the number of times one of the plurality of callable program parts is executed;

a determining unit which determines whether said number of times exceeds one of the first, second, or third predetermined thresholds that have successively larger values; and an optimizing unit which optimizes said one of said plurality of callable program parts by:

moving instructions that perform invariant operations in a loop outside the loop when said number of times exceeds the first predetermined threshold, enhancing an efficiency of a register usage when said number of times exceeds the second predetermined threshold, and expanding said one of the callable program parts into an in-line form when said number of times exceeds the third predetermined threshold.

6. A product according to claim 5, wherein said optimizing unit performs said optimization as a background operation of execution of at least one of said plurality of callable program parts, where a priority of the optimization is lower than a priority of the execution of said at least one of said plurality of callable program parts.

* * * * *

UNITED STATES PATENT AND TRADEMARK OFFICE
CERTIFICATE OF CORRECTION

PATENT NO. : 6,848,098 B1 Page 1 of 1
DATED : January 25, 2005
INVENTOR(S) : Tsuboi It is certified that error appears in the above-identified patent and that said Letters Patent is hereby corrected as shown below:

<u>Title page, Item [54] and Column 1, line 3,</u>
Title, please delete "BASE" and insert -- BASED -- therefore Signed and Sealed this Nineteenth Day of July, 2005

JON W. DUDAS
*Director of the United States Patent and Trademark Office*